United States Patent
Miyazaki

[19]

[11] Patent Number: 5,887,203
[45] Date of Patent: Mar. 23, 1999

[54] MOVEMENT DETECTION AND CONTROL DEVICE

[75] Inventor: Hiroaki Miyazaki, Kanagawa, Japan

[73] Assignee: Olympus Optical Co., Ltd., Tokyo, Japan

[21] Appl. No.: 719,780

[22] Filed: Sep. 25, 1996

[30] Foreign Application Priority Data

Sep. 26, 1995 [JP] Japan .................................. 7-247998

[51] Int. Cl.⁶ .......................... G03B 17/00; G03B 3/10; G03B 13/34
[52] U.S. Cl. ............................................. 396/87; 396/133
[58] Field of Search .......................... 396/89, 133, 240, 396/235, 269, 87, 103, 90; 250/231.18, 231.14, 231.15, 231.16, 231.17

[56] References Cited

U.S. PATENT DOCUMENTS

| | | | |
|---|---|---|---|
| 4,593,269 | 6/1986 | Nakamura et al. | 340/347 |
| 4,616,131 | 10/1986 | Burkhardt | 250/231 |
| 4,751,888 | 6/1988 | Hanus | 112/275 |
| 4,963,733 | 10/1990 | Spaulding | 250/231.16 |
| 5,142,314 | 8/1992 | Ogawa | 354/195.1 |
| 5,243,188 | 9/1993 | Hattori et al. | 250/231.17 |
| 5,508,767 | 4/1996 | Kazumi et al. | 354/106 |
| 5,701,525 | 12/1997 | Caterino et al. | 396/132 |
| 5,708,870 | 1/1988 | Sugita et al. | 396/87 |

FOREIGN PATENT DOCUMENTS

| | | |
|---|---|---|
| 58-221114 | 12/1983 | Japan . |
| 60-119528 | 6/1985 | Japan . |
| 60-203908 | 10/1985 | Japan . |
| 60-257307 | 12/1985 | Japan . |
| 5-31609 | 8/1993 | Japan . |
| 6-242484 | 9/1994 | Japan . |

*Primary Examiner*—Safet Metjahic
*Assistant Examiner*—Christopher E. Mahoney
*Attorney, Agent, or Firm*—Louis Weinstein

[57] ABSTRACT

A movement detection and control device has a lens frame holding a lens. The lens frame is movable in a direction of an optical axis of the lens. A revolving cam moves the lens frame in the direction of the optical axis. A driving source drives the cam. A pattern-rotating member having patterns for pulse generation, is rotated by the driving source. A detector detects the patterns, and generates pulse signals in response to driving by the driving source. A control circuit counts the pulse signals, and drives the driving source in a controlled manner to move the lens frame by a predetermined amount. The revolving cam is provided with a light-sealing member for intercepting the detector from generating pulse signals in an area where the cam starts or finishes its movement.

6 Claims, 11 Drawing Sheets

MOVEMENT DETECTION AND CONTROL DEVICE

BACKGROUND OF THE INVENTION

1. Field of the Invention

This invention relates to a movement detection and control device and, more particularly, to a movement detection and control device for detecting and controlling movement of a lens frame driven by a driving source.

2. Related Background Art

In a camera or equivalent apparatus for taking photographs, various proposals have been made and also put into practice in the past with respect to a mechanism and the like for automatically providing focus adjustment, exposure adjustment, and so forth.

For example, an exposure and focus adjustment device in a camera as disclosed in the published Japanese Utility Model Application Examined No. 5-31609 is constructed to permit the driving force of a rotational driving source (motor) to be selectively transmitted to a focus-adjusting mechanism and an exposure-adjusting mechanism via a differential gear mechanism. The above device is provided with a pulse-generating device, an AF switch, an AE switch, and so forth in order that unidirectional rotation of the motor provides driving in a controlled manner. The pulse-generating device is formed by both a mask plate having a plurality of slits and a photo-interruptor, thereby generating a pulse signal. The AF switch takes off a positional signal of a gear for automatic focusing from the pulse signal. The AE switch takes off a positional signal of a gear for automatic exposure from the pulse signal.

In addition, a lens mount disclosed in the published Japanese Patent Application Unexamined No. 6-242484 is a lens mount with a shutter device. The lens mount is provided with a photo-interruptor for automatic focusing, a photo-interruptor for automatic exposure, and so forth in order that bidirectional rotation of a motor provides driving in a controlled manner. The former photo-interruptor measures a moving distance of a gang of focusing lenses, while the latter photo-interruptor detects movement of a shutter vane-driving lever. The shutter vane-driving lever is driven by a plunger solenoid-driving device, and drives a shutter vane.

Turning back to the foregoing Application No. 5-31609, since a means disclosed therein requires a switch for taking off the positional signal, there exists a problem of an increase in manufacturing cost.

With further reference to the foregoing Application No. 6-242484, a means disclosed therein includes a cam ring for moving the gang of focusing lenses. The cam ring is once reversed at an initial step by the motor being rotated in one direction, whereby the cam ring is brought into abutting contact with a stopper. This state is set to be an initial position of the cam ring. The cam ring is thereafter brought into normal rotation from the initial position by the motor being rotated in the other direction. As a result, focusing drive is effected, while the photo-interruptor for automatic focusing is caused to provide detection. In short, bidirectional rotation of the motor provides driving in a controlled manner. This results in a complicated motor control circuit and a complicated sequence and the like, which may add to manufacturing costs.

SUMMARY OF THE INVENTION

A first object of the present invention is to provide a movement detection and control device enabling contribution toward savings in manufacturing costs of the aforesaid device per se by providing both a simpler member structure and a simpler action sequence being permitted to detect a moving position of a lens frame caused by a moving member, and to control such movement of the lens frame on the basis of results of the detection.

A second object of the present invention is to provide a movement detection and control device capable of providing actions in a more efficient manner to detect a moving position of a lens frame caused by a moving member, and to control such movement of the lens frame.

To be brief, a movement detection and control device according to one aspect of the present invention comprises a moving means driven by a driving source, and a pulse-generating means for continually generating a pulse signal on a cyclic basis in response to driving caused by the driving source, wherein the moving means is provided with an inhibiting means for hindering the pulse-generating means from generating the pulse signal in an area where the moving means starts and/or finishes its movement.

A movement detection and control device according to another aspect of the present invention comprises a lens frame having a lens, the lens frame being supported in a manner movable in a direction of an optical axis of the lens, a moving means for moving the lens frame in the direction of the optical axis, a driving source for driving the moving means, a pulse-generating means for generating a pulse signal in response to driving caused by the driving source, a control means for counting pulse signals resulting from the pulse-generating means, and further for driving the driving source in such a controlled manner that the lens frame is moved by a predetermined amount, and an inhibiting means for hindering the pulse-generating means from generating the pulse signal in an area where the moving means starts or finishes its movement.

In addition, the movement detection and control device is characterized in that the pulse-generating means consists of a pattern-rotating member having patterns for pulse generation, the pattern-rotating member being freely rotated, and a detecting section for detecting the patterns, and further that the inhibiting means stops generation of the pulse signal by a portion of the moving means being interposed between the detecting section and the pattern-rotating member.

This and other objects and advantages of the present invention will become further apparent from the following detailed explanation.

Pursuant to the present invention, it is possible to provide the movement detection and control device capable of contributing toward a reduction in the cost of manufacturing the above device itself by both a simpler structure and a simpler action sequence being caused to detect a moving position of the lens frame caused by the moving member, and to control such movement of the lens frame.

DETAILED DESCRIPTION OF THE PREFERRED EMBODIMENTS

Initially, a movement detection and control device according to a first embodiment is illustrated, e.g., as being used in a camera and the like for taking photographs. More specifically, the aforesaid device is illustrated as being employed in order to detect and control movement of a lens frame having a photographic lens for automatic focus adjustment.

Figure 1:
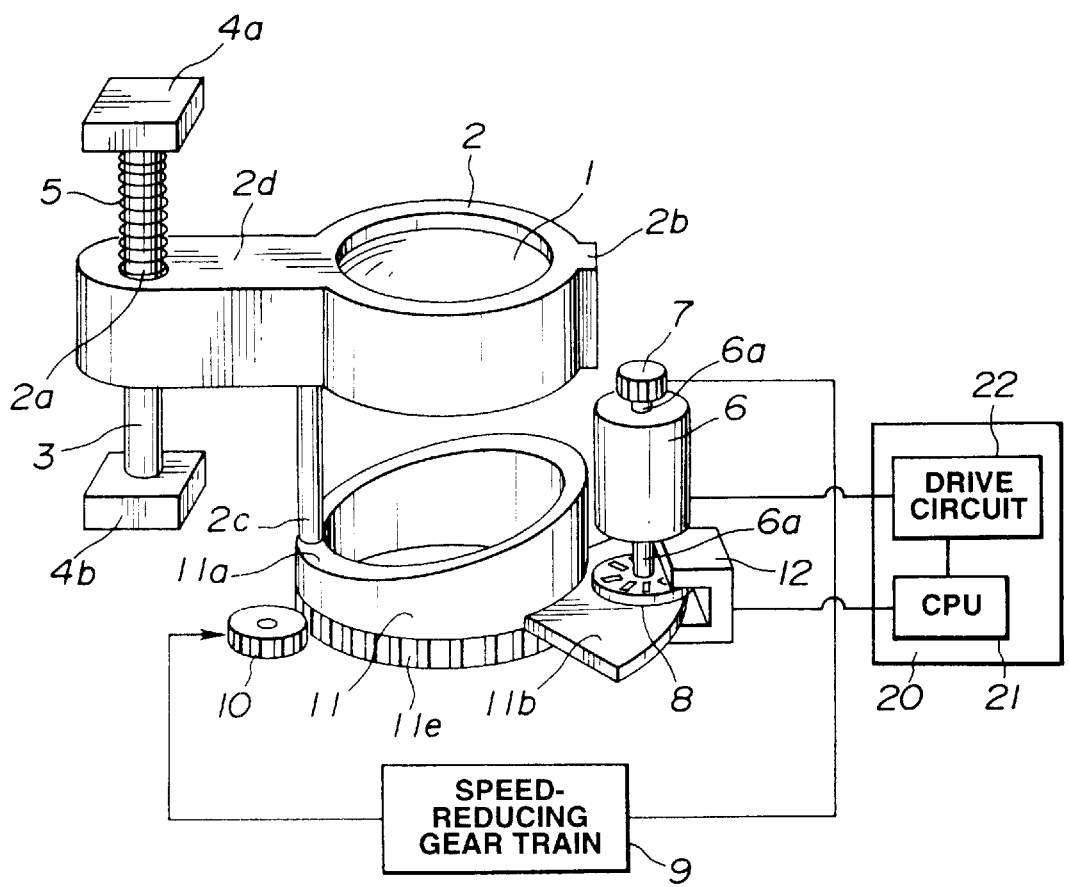
FIG. 1 is a perspective view, illustrating a schematic structure of a movement detection and control device according to a first embodiment of the present invention.

FIG. 1 depicts the movement detection and control device. In this device, a lens frame 2 is a driven member and camera member which has a photographic lens optical system of a camera, or a photographic lens 1, and further which is supported in a manner movable in a direction of an optical axis of the lens 1. The lens frame 2 has an arm portion 2d and a protruding portion 2b provided on respective portions of an outer circumferential surface thereof. The arm portion 2d and the protruding portion 2b are positioned in an opposed relationship to one another. The arm portion 2d has a hole portion 2a drilled at one end thereof. The hole portion 2a has a shaft member 3 slidably fitted therein. The shaft member 3 is supported in a state of being sandwiched at both ends thereof by inner fixed members 4a and 4b of a main camera body (not shown) which incorporates the movement detection and control device therein.

The protruding portion 2b of the lens frame 2 is slidably fitted in a dented (i.e. grooved) portion (not shown) that is provided in the main camera body. As a result, the lens frame 2 is locked against rotation with respect to the main camera body, and slides only in an axial direction of the shaft member 3, i.e., only in the direction of the optical axis of the photographic lens 1.

The shaft member 3 has an urging member 5 looped therearound between the fixed member 4a and the arm portion 2d, thereby urging the lens frame 2 toward a revolving cam 11. (The cam 11 will be described hereinafter.) The urging member 5 includes, e.g., a coiled spring or equivalent.

The arm portion 2d has an abutment pin 2c planted at a proximal end thereof. The abutment pin 2c extends rearward in the direction of the optical axis of the photo-graphic lens 1. Further, the revolving cam 11 is provided on the rearward side along the direction of the optical axis. The revolving cam 11 is a moving means supported on a fixed member (not shown) of the main camera body in a manner rotatable about the center coaxial with the optical axis.

As previously mentioned, a distal end of the abutment pin 2c is held in abutting contact with a cam surface 11a by the urging force of the urging member 5. The cam surface 11a is a cam portion and cam member of the revolving cam 11.

The cam 11 is a moving member and moving means which is driven into rotation by a driving source or a motor 6. (The motor 6 will be described hereinafter.) The cam 11 is formed by the following: the cam surface 11a for changing a position of the lens frame 2 in the direction of the optical axis; a light-sealing member 11b or an inhibiting means for impeding a pulse-generating means (the pulse-generating means will be described hereinafter) from generating a pulse signal by way of rotational movement of the cam 11 in a predetermined area of a moving range of the cam 11, i.e., in an area where the cam 11 starts or finishes its movement; and, a gear portion lie for transmitting the rotational driving force of the motor 6 to the cam 11. The gear portion lie has a gear 10 meshed therewith.

The motor 6, which is a driving source and rotational driving source, has a pinion gear 7 rotatably supported at one end of a revolving shaft 6a thereof, while having a slit plate 8 rotatably supported at the other end of the revolving shaft 6a. The slit plate 8 is a pattern member, a pattern-rotating member, and a pulse-generating and rotating member, which has a circular plate shape, and further which is formed with patterns for generation of the pulse signal, more specifically, a plurality of slits (pattern openings, optically transparent portions) circumferentially spaced apart from each other at even intervals. In this connection, the rest of the slit plate 8 other than the plurality of slits (the optically transparent portions) is a light tight portion for blocking entrance of light.

In addition, a photo-interruptor (hereinafter called PI) 12 is rigidly secured to an inner fixed member (not shown) of the main camera body. This PI 12 is a detecting section and pulse signal-detecting means which is formed by a light-emitting portion and a light-receiving portion positioned in an opposed relationship to one another. PI 12 and the slit plate 8 form the pulse-generating means.

More specifically, the slit plate 8 is positioned so as to be interposed between the light-emitting portion and the lightreceiving portion. The slit plate 8 is rotated in response to driving caused by the motor 6, thereby continually generating a pulse signal on a cyclic basis. PI 12 then detects such a pattern of the pulse signal.

The light-sealing member 11b is constructed to be inserted between PI 12 and the slit plate 8 when being moved in union with free rotation of the revolving cam 11. As a result, an optical path extending between the light-emitting portion and the light-receiving portion is blocked to impede the occurrence of the pulse signal which would otherwise result from the pulse-generating means formed by both PI 12 and the slit plate 8 (first state). Meanwhile, when such a light tight state caused by the light-sealing member 11b is released, the pulse-generating means is allowed to produce the pulse signal (second state). In this connection, when the revolving cam 11 is in the first state, the lens frame 2 having the photographic lens 1 assumes an initial position. When the cam 11 is in the second state, the lens frame 2 assumes a position in the process of its movement.

The pinion gear 7 is connected to the gear portion 11e of the cam 11 through a speed-reducing gear train 9 and the gear 10, whereby the rotational driving force of the motor 6 is transmitted to the revolving cam 11.

Further, the main camera body has a counting means and control means 20 provided therein for counting up pulse signals produced by the pulse-generating means, and further for controlling the driving rotation of the motor 6 in such a manner that the lens frame 2 is moved by a predetermined amount. The control means 20 consists of a drive circuit 22, CPU (central processing unit) 21, and the like.

In this connection, the motor 6 applied in the first embodiment is arranged to drive a moving means or the revolving cam 11 by being brought into unidirectional rotation.

With continued reference to the movement detection and control device constructed as described hereinabove according to the first embodiment, descriptions will now be made with reference to FIGS. 1–6 as to how the aforesaid device behaves.

Figure 6:
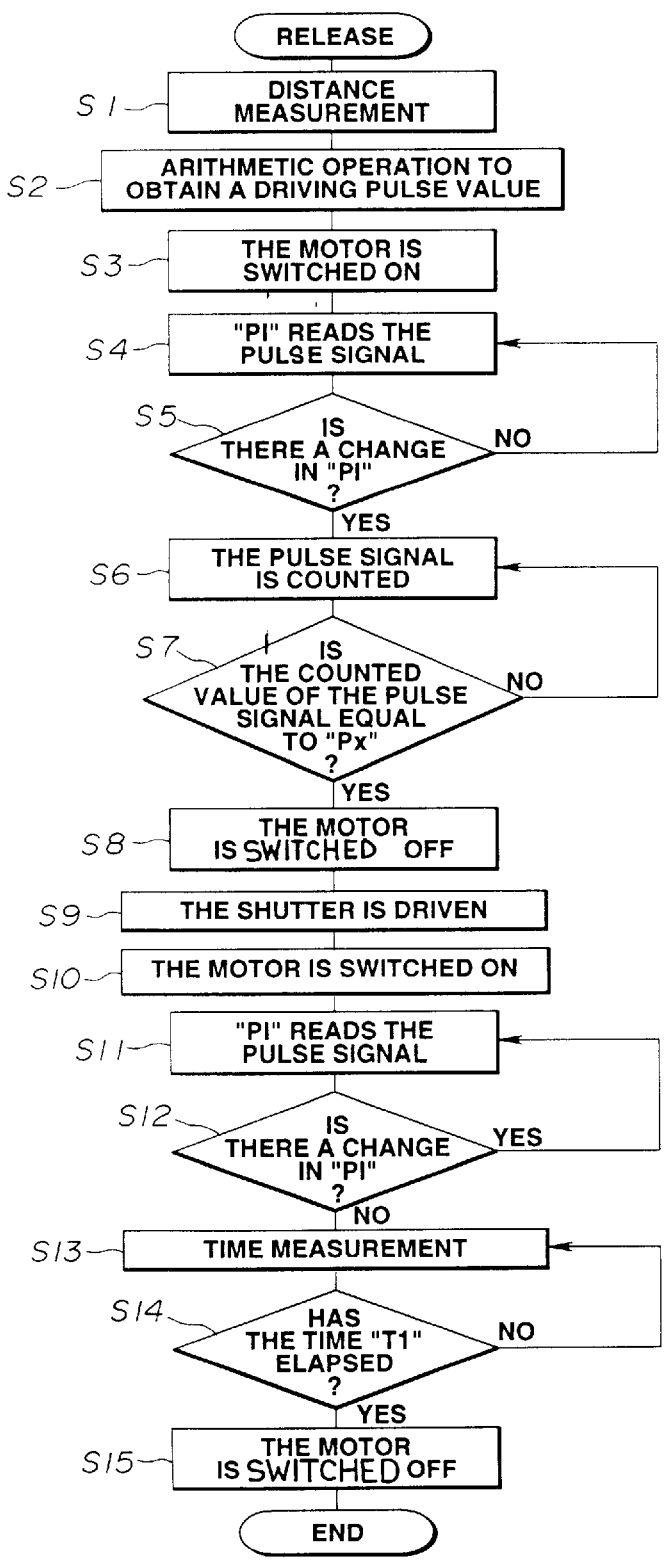
FIG. 6 is a flow chart, showing how the preceding device behaves.

As illustrated by a flow chart in FIG. 6, in a camera and the like incorporating the movement detection and control device according to the first embodiment, when an operational member for generating a signal to start photographic action, i.e., a release button or equivalent (not shown), is pressed, a distance-measuring device (not shown) disposed in the camera provides action, at initial step S1, to measure a distance at which a subject is situated. Then, the routine is advanced to step S2 for subsequent processing.

At step S2, an arithmetic operation is performed on the basis of results of the aforementioned distance measurement in step S1 in order to obtain an amount of the photographic lens 1 to be moved to a focused position. A further arithmetic operation is conducted to obtain a driving pulse value (Px) which is required for moving the lens 1 to the focused position. Then, the routine is advanced to step S3 for the next processing.

At step S3, the motor 6 is switched on, and then starts its driving rotation. (See the position designated by reference character A1 in FIG. 5.) As a result, the slit plate 8 starts its rotation. Then, the routine is advanced to step S4 for the next processing. At step S4, PI 12 initiates reading of a pulse signal. In the next processing at step S5, a check is made to see if there is a change in PI 12. More specifically, the pulse signal produced from PI 12 is checked.

Figure 2:
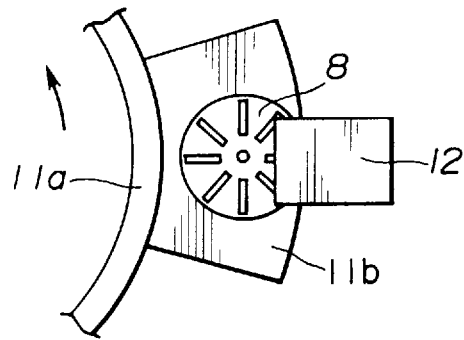
FIG. 2 is an enlarged view, illustrating an essential portion of the movement detection and control device of FIG. 1 in close proximity to a photo-interruptor (PI) when being viewed from an upper side of the PI, and further showing an initial state.

Turning now to FIG. 2, the light-sealing member 11b of the revolving cam 11 is shown positioned between the light-emitting portion and the light-receiving portion of PI 12. In this case, the light-sealing member 11b blocks light from the light-emitting portion. As a result, the lightreceiving portion receives no light from the light-emitting portion. Consequently, no pulse signal is generated, even when the slit plate 8 is turned. As a result, PI 12 remains in an unchanged state. (See the state defined between A1 and B1 in FIG. 5.)

Figure 3:
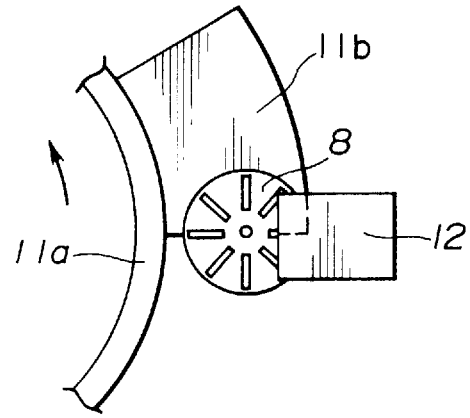
FIG. 3 is an enlarged view, illustrating the essential portion of the aforesaid device in close proximity to PI when being viewed from the upper side of the PI, and further showing a state when PI generates a pulse signal.

Further continued rotation of the cam 11 leads to a state shown in FIG. 3, thereby releasing such a light tight state caused by the light-sealing member 11b between the light-emitting portion and the light-receiving portion. As a result, when the slit portions of the slit plate 8 pass between the light-emitting portion and the light-receiving portion, the light-receiving portion receives light from the light-emitting portion, thereby starting to generate the pulse signal. (See position B1 in FIG. 5.) Accordingly, PI 12 begins to undergo a change in its state. Then, the routine is advanced to step S6 for the next processing.

At step S6, the pulse signal from PI 12 is counted up by the control means 20. In the next processing at step S7, comparison is made between an enumerated value of the pulse signal and the driving pulse value (Px).

To be specific, the pulse signal from PI 12 is repeatedly counted up until the enumerated value of the pulse signal becomes equal to the driving pulse value (Px). When a state of the enumerated value=Px occurs, the routine is advanced to step S8 for the next processing. At step S8, the motor 6 is switched off. (See position C1 in FIG. 5.) Then, the routine is advanced to step S9 for the next processing.

Figure 5:
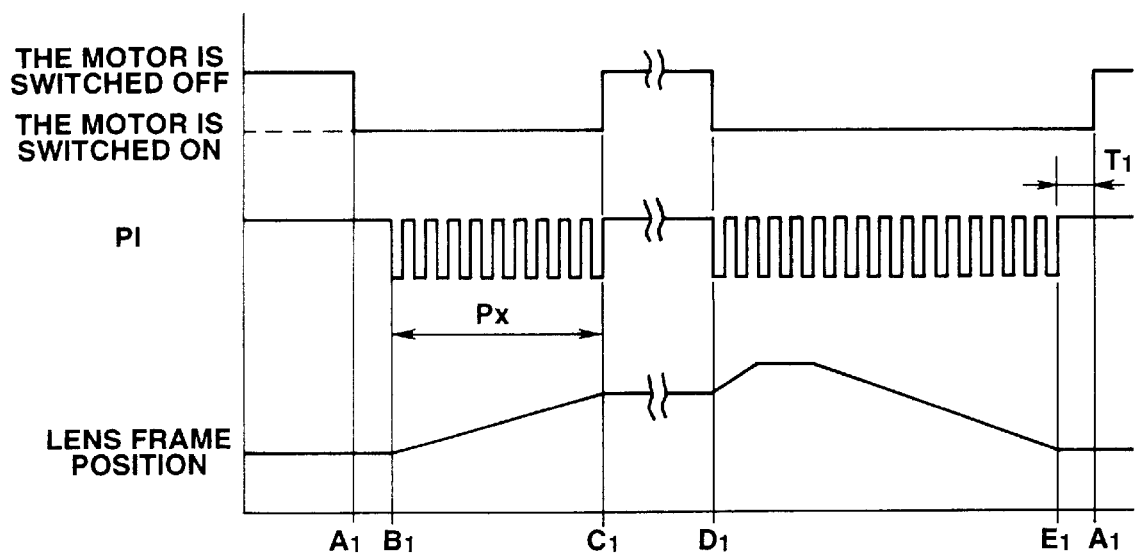
FIG. 5 is a time chart, illustrating how the foregoing device acts.

In this connection, referring to FIG. 5, when the pulse signal is generated (see position B1), the lens frame 2 having the lens 1 is shown starting its movement substantially simultaneously in response to a lift amount of the cam surface 11a. The motor 6 is switched off and stops its rotation (see position C1 in FIG. 5) when the lens frame 2 is moved to a position both where a subject is focused, i.e., a focused position based on the results of distance measurement in step S1, and where the state of the enumerated value (=the driving pulse value)=Px occurs.

At step S9, an exposing means of the camera, i.e., a shutter (not shown) or equivalent, is driven to provide exposure action. (See the state between C1 and D1 in FIG. 5.) When the exposure action is finished, the motor 6 is switched on again, and then starts its driving rotation at the following step S10. (See position D1 in FIG. 5.) The cam 11 and the slit plate 8 starts respective rotation in union with the driving rotation of the motor 6. Concurrently, the lens frame 2 starts resetting action. Then, the routine is advanced to step S11 for the next processing.

At step S11, PI 12 starts reading the pulse signal in a manner similar to step S4. In the following processing at step S12, a check is made to see if there is a change in PI 12. That is, the pulse signal produced from PI 12 is checked.

Figure 4:
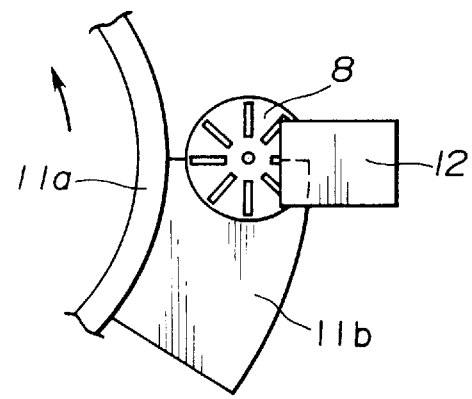
FIG. 4 is an enlarged view, illustrating the essential portion of the aforesaid device in close proximity to the PI when being viewed from the upper side of PI. and further showing a state when a light-sealing member blocks light from entering PI.

At this time, the light-sealing member 11b is not located between the light-emitting portion and the light-receiving portion. Consequently, PI 12 continues to generate the pulse signal. As illustrated in FIG. 4, further continued rotation of the cam 11 causes the light-sealing member 11b to block light from entering between the light-emitting portion and the light-receiving portion. As a result, PI 12 is inhibited from generating the pulse signal. More specifically, PI 12 stops generating the pulse signal, and remains in an unchanged state. (See position E1 in FIG. 5.) Then, the routine is advanced to step S13 for the next processing.

At step S13, the control means 20 starts time measurement (timer count). At the next step S14, the control means 20 monitors the measured time. When a predetermined period of time T1 (see the state between E1 and A1 in FIG. 5) elapses, the routine is advanced to step S15 for the next processing. In the processing at step S15, the motor 6 is switched off, and this continuous sequence ends.

In this connection, the cam 11 and PI 12 are now in a state of being the same as they were before the release button is pressed. More specifically, the cam 11 and PI 12 have been returned to the initial state shown in FIG. 2. In addition, the lens frame 2 stops in a state of having been back to its initial position.

Now, attention is directed to rotational frequencies of the motor 6 for effecting one revolution of the cam 11, which means, "n" rotations of the slit plate 8. Since "n" is set to be an integer multiple, the slit plate 8 is thereby caused to always assume the same rotational position in a state shown in FIG. 3, or when the light-sealing member lid begins retracting from PI 12 between the light-emitting portion and the light-receiving portion. As a result, errors in reading the pulse signal are prevented from occurring.

As described above, according to the first embodiment, movement of the lens frame 2 caused by the cam 11 can be detected and controlled by means of: one pulse-generating means (PI 12 and the slit plate 8); and, the revolving cam 11 having the light-sealing member 11b thereon. At the same time, such detection and control can be realized without a plurality of position-detecting switches SW and the like being disposed in the movement detection and control device. As a result, a simpler member structure and simpler action sequence are achievable, which can contribute toward savings in manufacturing costs of the aforesaid device itself.

In this connection, the first embodiment provides an illustration in which one rotation of the revolving cam 11 results in one sequence. Alternatively, an improved cam shape of the cam 11 makes it possible to provide one sequence for, e.g., a half rotation, a third rotation, or a fourth rotation, and so forth, of the cam.

Figure 7:
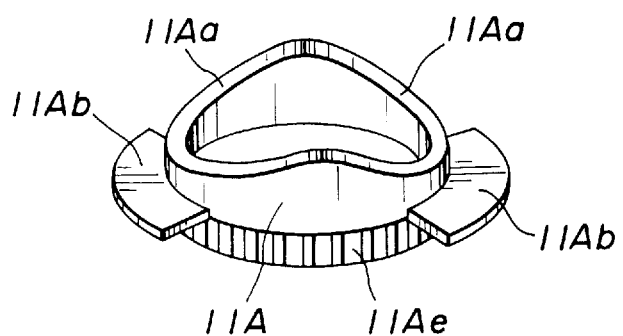
FIG. 7 is a perspective view, depicting a variation example with respect to a revolving cam according to the first embodiment.

As an example, FIG. 7 illustrates a variant of the revolving cam 11 according to the first embodiment. A cam 11A in this variation example is substituted for the cam 11, and a half rotation of the cam 11A can realizes one sequence.

More specifically, as illustrated in FIG. 7, the cam 11A is formed with: a pair of cam surfaces 11Aa for changing a position of the lens frame in the optical axis; and, a pair of light-sealing members 11Ab or inhibiting means for blocking the pulse-generating means from generating the pulse signal by the cam 11A being brought into rotational movement in a predetermined area of a moving range of the cam 11A. In addition, the cam 11A has a gear portion 11Ae provided on a circumferential surface on the lower side thereof for transmitting the rotational driving force of the motor 6 thereto.

The movement detection and control device employing the cam 11A, which is structured as above, behaves in a manner quite similar to the sequence (see FIG. 6) which has just been described in the first embodiment. In addition, such one continuous sequence is executed while the cam 11A rotates a half rotation.

As a result, this variation example can obtain beneficial effects quite similar to those in the first embodiment. In addition, since two sequences are executed while the cam 11A rotates one rotation, movement-detecting operation can be effected in a speedier and more efficient manner.

Next, a movement detection and control device according to a second embodiment will be described hereinbelow. This device according to the second embodiment provides a construction basically similar to that of the device according to the first embodiment, but different from the first embodiment in that the revolving cam 11 is replaced by a linearly traveling cam 13 which is a moving member and moving means to be driven into linear traveling. Accordingly, the same reference characters are given in the second embodiment for component members similar to those in the first embodiment; therefore, descriptions related thereto will be abbreviated.

In addition, the movement detection and control device according to the second embodiment is also illustrated, e.g., as being used in order to detect and control movement of a photographic lens for automatic focus adjustment in a camera or equivalent for taking photographs.

Figure 8:
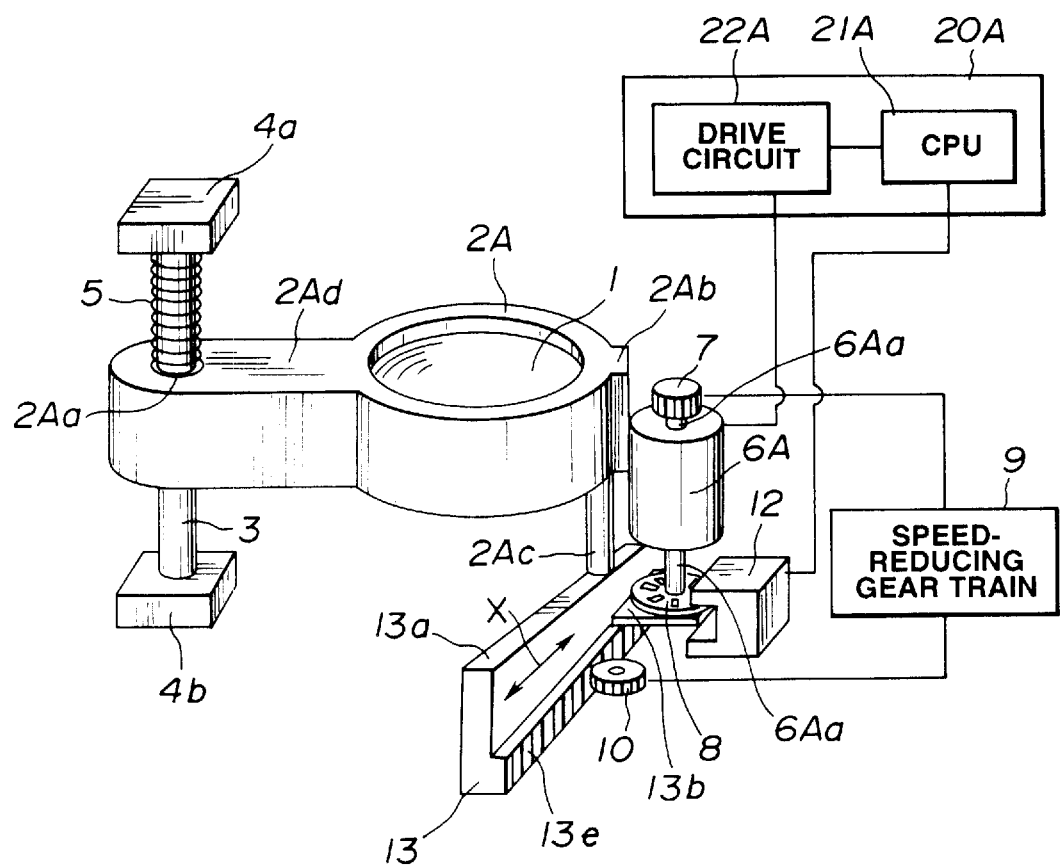
FIG. 8 is a perspective view, illustrating a schematic structure of a movement detection and control device according to a second embodiment.
Figure 9:
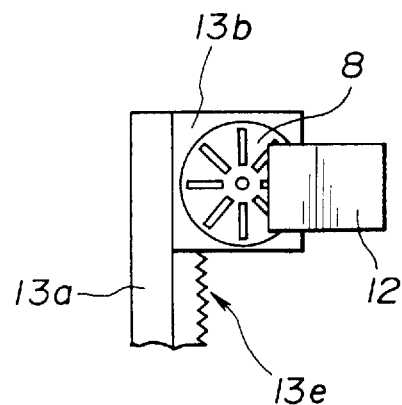
FIG. 9 is an enlarged view, illustrating an essential portion of the movement detection and control device of FIG. 8 in close proximity to a photo-interruptor (PI) when being viewed from an upper side of the PI, and further showing an initial state.
Figure 10:
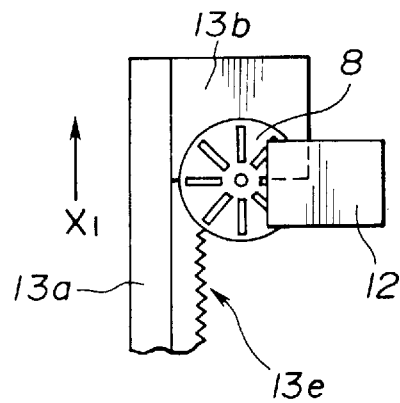
FIG. 10 is an enlarged view, illustrating the essential portion of the aforesaid device in close proximity to the PI when being viewed from the upper side of the PI, and further showing a state when PI generates a pulse signal.

FIG. 8 illustrates the movement detection and control device. In this device, a lens frame 2A has a photographic lens 1, and is supported in a manner movable in a direction of an optical axis of the lens 1. The lens frame 2a has an arm portion 2Ad and a protruding portion 2Ab provided on respective portions of an outer circumferential surface thereof. In addition, the arm portion 2Ad has a hole portion 2Aa punched at one end thereof. The hole portion 2Aa has a shaft member 3 slidably fitted therein. Similar to the first embodiment, the shaft member 3 is supported in a state of being sandwiched at opposite ends thereof by inner fixed members 4a and 4b of a main camera body (not shown) which has the movement detection and control device employed therein.

The protruding portion 2Ab is slidably fitted in a dented portion (not shown) which is provided in the main camera body. As a result, the lens frame 2A is locked against rotation with reference to the main camera body, and slides only in an axial direction of the shaft member 3, i.e., only in a direction of the optical axis of the photographic lens 1.

The protruding portion 2Ab has an abutment pin 2Ac planted at a proximal end thereof. Further, there is a moving means and moving member, i.e., the linearly traveling cam 13, provided in a rearward direction of the lens 1. This cam 13 is supported on a fixed member (not shown) of the main camera body in a manner slidable in a direction perpendicular to the optical axis.

Similar to the first embodiment, a distal end of the abutment pin 2Ac is held in abutting contact with a cam surface 13a of the cam 13 by way of the urging force of the urging member 5.

As previously indicated, the cam 13 is positioned on the fixed member (not shown) of the main camera body in such a manner as to be brought into linearly traveling motions in a direction of arrow "X" shown in FIG. 8, i.e., in the direction perpendicular to the optical axis. The cam surface 13a is provided on an upper surface portion of the cam 13 for changing a position of the lens frame 2A in the direction of the optical axis. Further, the cam 13 is provided integrally with a light-sealing member 13b on a side surface of the cam 13 in a substantially intermediate portion thereof for intercepting a pulse signal which would otherwise be generated by a pulse-generating means. The pulse-generating means consists of PI 12 and a slit plate 8.

The cam 13 has a gear portion 13e provided on a lower side of the side surface thereof for bringing the cam 13 into linearly traveling motions, whereby the cam 13 is moved in the direction of arrow "X" in FIG. 8.

The gear portion 13e is in mesh with a gear 10 which is rotatably supported on the main camera body. The gear 10 is connected to a speed-reducing gear train 9. Further, the gear 10 is connected to a pinion gear 7 through the speedreducing gear train 9. The pinion gear 7 is rotatably supported at one end of a revolving shaft 6Aa of a driving source or a motor 6A. As a result, the rotational driving force of the motor 6A is transmitted to the cam 13.

In this connection, the motor 6A applied in the present embodiment is such as to be rotatable in both normal and reverse directions (bidirectional rotation) in order to drive the cam 13 into linearly traveling motions in one of the directions of double-headeded arrow "XI" in FIG. 8. In order words, the motor 6A is brought into bidirectional rotation under the control of a control means 20A, whereby the cam 13 is driven in the arrow direction "X" in FIG. 8. The control means 20A consists of CPU 21A, a drive circuit 22A, and so on.

The light-sealing member 13b on the cam 13 is positioned so as to be inserted between two portions of PI 12, i.e., between a light-receiving portion and a light-emitting portion. As a result, the light-sealing member 13b blocks light from entering between the light-receiving portion and the light-emitting portion when being moved in union with sliding movement of the cam 13. Meanwhile, when such a light tight state caused by the light-sealing member 13b is released, PI 12 and the slit plate 8 are allowed to generate the pulse signal.

With continued reference to the movement detection and control device constructed as described hereinabove according to the second embodiment, descriptions will now be provided with reference to FIGS. 8–13 as to how the preceding device behaves.

Figure 13:
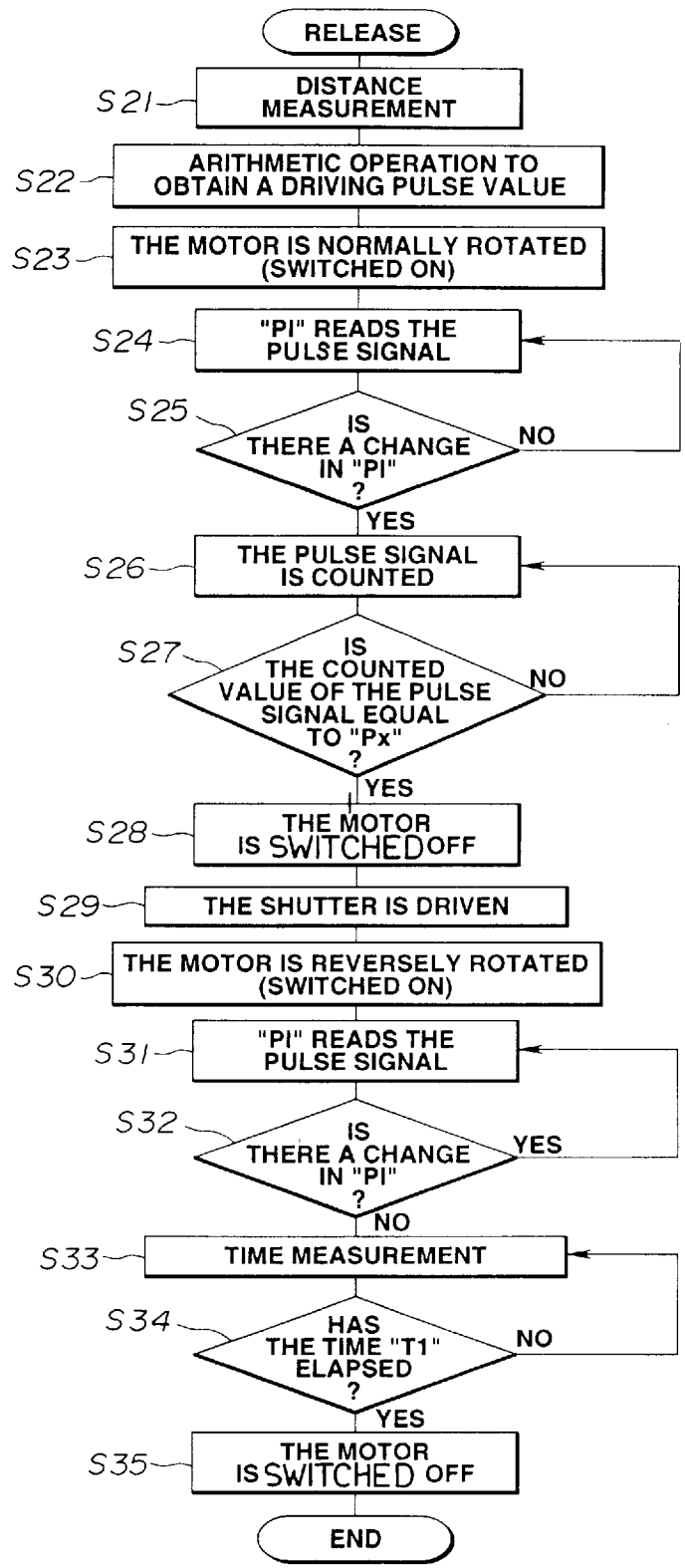
FIG. 13 is a flow chart, showing how the preceding device behaves.

Referring now to a flow chart in FIG. 13, in a camera incorporating the movement detection and control device therein, when an operational member for generating a signal to start photographic action, i.e., a release button or equivalent (not shown), is pressed, then, at initial step S21, a distance-measuring device (not shown) disposed in the camera measures a distance at which a subject is situated. Continuous processing at steps S21 through S29, i.e., a series of actions between the moment a shutter is driven and the moment exposure action is provided, are quite similar to such actions at steps S1 through S9 of FIG. 5 as described in the first embodiment. However, as mentioned earlier, the motor 6A employed in the present embodiment is such as to be rotatable in the normal and reverse directions, or bidirectional rotation. Thus, the motor 6A rotates in the normal direction when being switched on at step S23 of FIG. 13. The rotation of the motor 6A in the normal direction causes the cam 13 to be linearly traveled in one direction. (See the direction shown by arrow "X1" in FIG. 10.)

At step S30, the motor 6A is switched on through both CPU 21A and the drive circuit 22A, and thereby restarts its driving rotation. CPU 21A and the drive circuit 22A form the control mean 20A. At this time, however, the motor BA is rotated in the reverse direction. That is, the motor 6A now turns in a direction opposite to the aforesaid rotational direction of the motor 6A in step S23. (See position D1 in FIG. 12.) Then, the cam 13 is concomitantly moved to linearly travel in a direction opposite to the aforesaid moving direction of the cam 13 in step S23. (See the direction indicated by arrow "X2" in FIG. 11.) That is, the cam 13 begins returning to an initial state shown in FIG. 9. As a result, the lens frame 2A starts retracting action. At the same time, the slit plate 8 starts turning. Then, the routine is advanced to step S31 for next processing.

At step S31, PI 12 initiates reading of the pulse signal. In the next processing at step S32, a check is made to see if there is a change in PI 12. That is, the pulse signal produced from PI 12 is checked.

Figure 11:
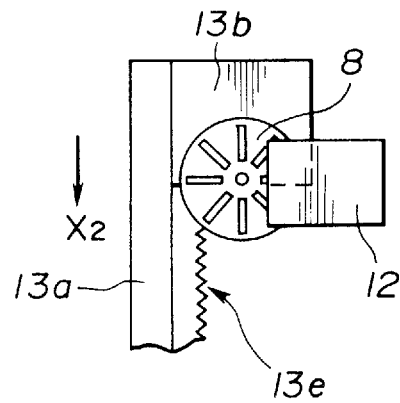
FIG. 11 is an enlarged view, illustrating the essential portion of the aforesaid device in close proximity to the PI when being viewed from the upper side of the PI, and further showing a state when a light-sealing member blocks light from entering the PI.
Figure 12:
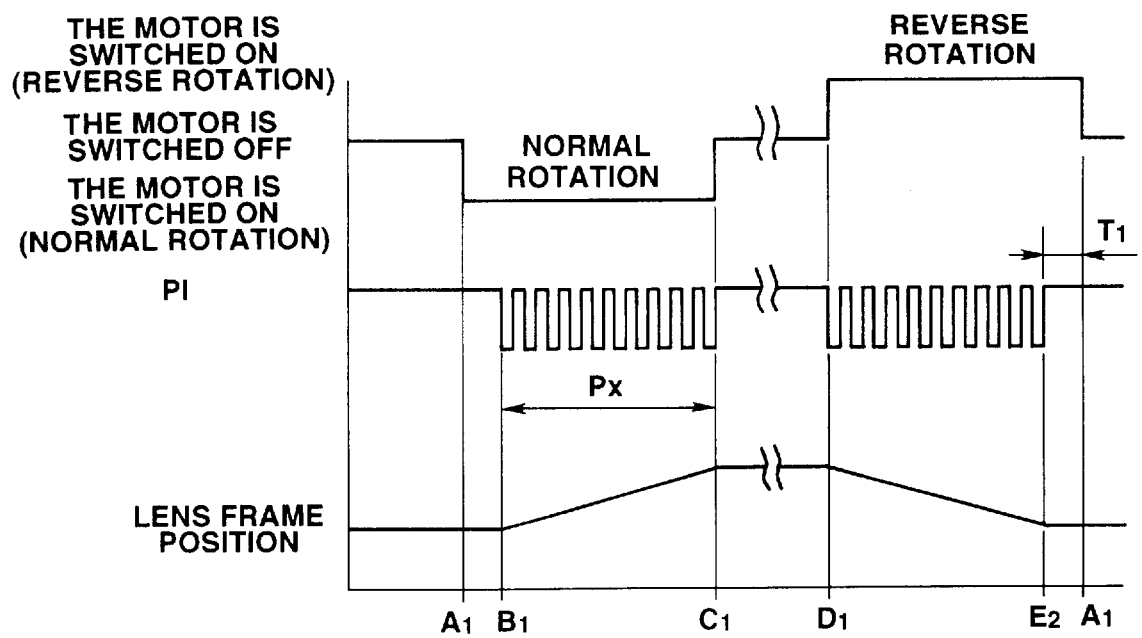
FIG. 12 is a time chart, showing how the foregoing device acts.

At this time, PI 12 continues to generate the pulse signal because the light-sealing member 13b is not located between the light-emitting portion and the light-receiving portion. However, as illustrated in FIG. 11, further continued movement of the cam 13 causes the light-sealing member 13b to block light from entering between the light-emitting portion and the light-receiving portion. As a result, PI 12 is inhibited from generating the pulse signal. (See the state shown by E2 in FIG. 12). To be specific, PI 12 stops generating the pulse signal, and remains in an unchanged state. Then, the routine is advanced to step S33 for the next processing.

At step S33, the control means 20A starts time measurement (timer count). At the next step S34, the control means 20A monitors the measured time. When a predetermined period of time T1 (see the state between E2 and A1 in FIG. 12) elapses, the routine is advanced to step S35 for the next processing in which the motor 6A is switched off through both CPU 21A and the drive circuit 22A. Then, this continuous sequence ends.

In this connection, the cam 13 and PI 12 are now in a state of being at the same position as they were before the release button is pressed. More specifically, the cam 13 and PI 12 have been returned to the initial state shown in FIG. 9. In addition, the lens frame 2A stops in a state of having been back to its initial position.

As described above, the second embodiment makes it possible to provide beneficial effects similar to those in the first embodiment by way of incorporating the following therein: one pulse-generating means (PI 12 and the slit plate 8); the linearly traveling cam 13 having the light-sealing member 13b thereon; and, the motor 6A capable of bidirectional rotation in the normal and reverse directions.

In this connection, the movement detection and control device according to the first and second embodiments is constructed in such a manner that movement of a lens frame having a photographic lens is detected by a pulse-generating means; and, the preceding device is illustrated as being used for automatic focus adjustment in a camera or equivalent. However, the same is not limited thereto. Such a device is also applicable, e.g., in changing a focal length of a zoom lens so as to provide action to vary a magnifying power of a photographic lens in a camera or equivalent.

In addition, the photo-interruptor (PI) 12 in the first and second embodiments is applied as a member forming part of the pulse-generating means, but the same is not limited thereto. For example, a photo-reflector (PR), a Hall device, and so forth may also be applied as members constituting the pulse-generating means.

Next, a movement detection and control device according to a third embodiment will briefly be described with reference to FIGS. 14 and 15. In this embodiment, a photo-reflector as a detecting section is substituted for the photo-interruptor (PI) 12, i.e., the detecting section forming part of the pulse-generating means in the first and second embodiments. Consequently, the movement detection and control device according to the present embodiment is constructed in a manner basically similar to the device according to the first embodiment. Accordingly, the same reference characters are hereinafter given for component members similar to those in the first embodiment; therefore, detailed descriptions related thereto will be omitted.

Figure 14:
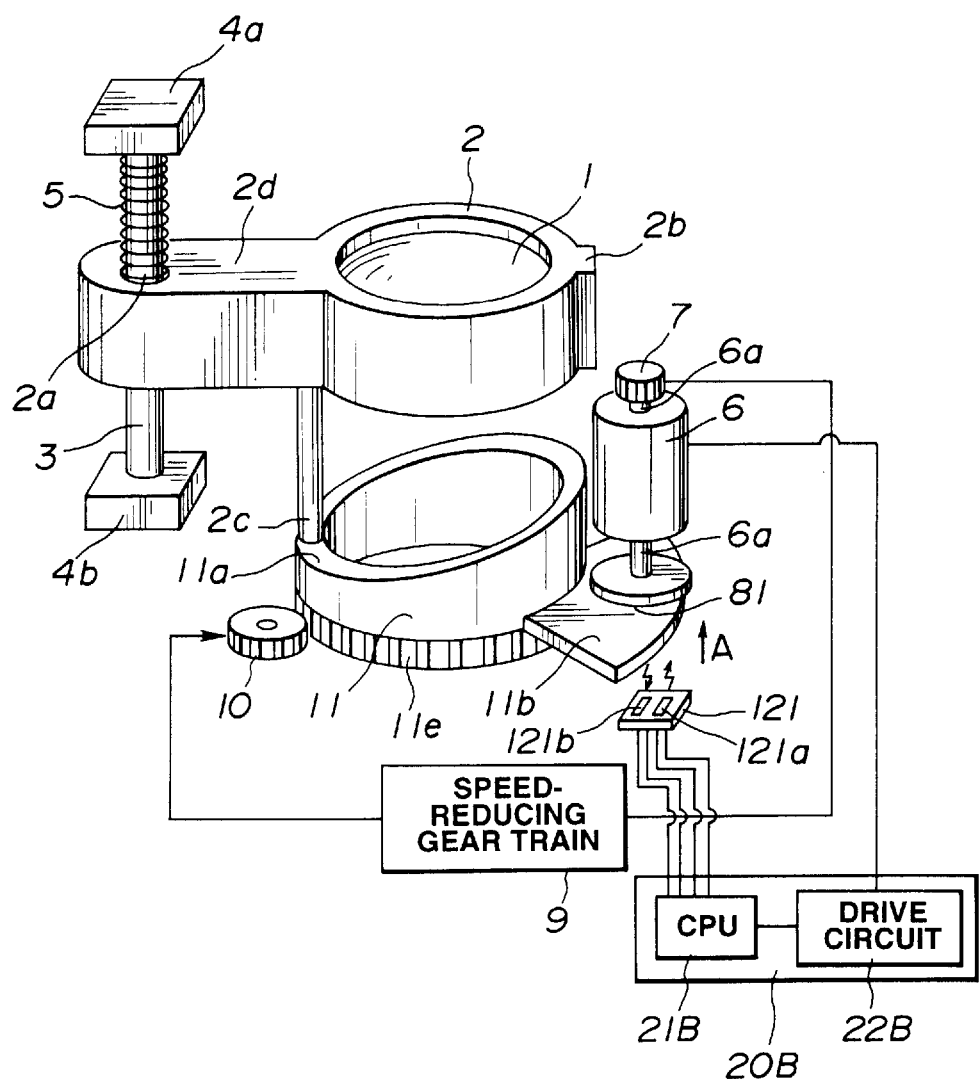
FIG. 14 is a perspective view, illustrating a schematic structure of a movement detection and control device according to a third embodiment; and, FIG. 15 is an enlarged view, illustrating an essential portion of the movement detection and control device adjacent to a rotating circular plate when being viewed from a direction of arrow "A" shown in FIG. 14.
Figure 15:
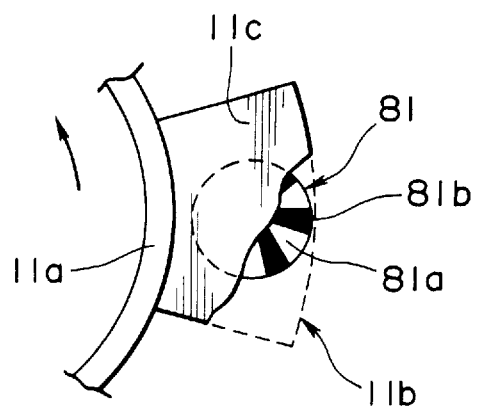

As illustrated in FIG. 14, the following component member in the movement detection and control device according to the present embodiment are similar to those in the first embodiment: a lens frame 2 having a photographic lens 1; a shaft member 3 for supporting the lens frame 2 in a manner slidable in relation to a main camera body; an urging means 5 wound around the shaft member 3 for constantly urging the lens frame 2 toward a revolving cam 11; an abutment pin 2c planted at a proximal end of an arm portion 2d of the lens frame 2; a driving source or a motor 6; the revolving cam 11 formed by a cam surface 11a, a light-sealing member 11b, a gear portion 11e, and so forth; a speedreducing gear train 9 for transmitting the rotational driving force of the motor 6 to the gear portion 11e through a gear 10; and, a control means 20B consisting of CPU 21B, a drive circuit 22B, and so forth.

The motor 6 has a pinion gear 7 rotatably supported at one end of a revolving shaft 6a thereof in a manner similar to the first embodiment. Meanwhile, the motor 6 has a revolving circuit plate 81 rotatably supported at the other end of the revolving shaft 6a. This revolving circuit plate 81 is substituted for the slit plate 8 according to the first embodiment. The circular plate 81 is a patternrevolving member and a pulse-generating and rotating member, and is also a first optical control member. As illustrated in FIG. 15, the circular plate 81 is formed with a plurality of patterns for generation of a pulse signal on one side surface thereof (i.e., on a surface opposing the photoreflector, which photoreflector will be described hereinafter). To be specific, a plurality of optically reflective portions 81a and optically non-reflective portions 81b are circumferentially spaced apart from one another in an alternating manner at predetermined intervals.

Referring back to FIG. 14, a photo-reflector (hereinafter called PR) 121 is shown positioned to oppose the aforesaid surface of the circular plate 81 having the optically reflective portion 81a and the non-reflecting portion 81b formed thereon. This PR121 is a detecting section and pulse signal-detecting means, and is also a light-detecting device. PR 121 includes a light-irradiating means 121a and a light-receiving means 121b. PR121 is rigidly mounted on an inner fixed member (not shown) of the main camera body. PR 121 and the circular plate 81 form a pulse-generating means. In this connection, the cam 11 according to the present embodiment is provided with a second optical control member, i.e., a light-sealing member 11b, on an outer circumferential portion thereof; and, the light-sealing member 11b has an optically reflective surface 11c formed on the reverse side thereof for reflecting an optical signal.

As previously mentioned, PR 121 and the circular plate 81 are positioned to oppose one another, and free rotation of the circular plate 81 causes the pulse signal to be generated as a result of two cases in which: one case where the optical signal irradiated from the light-irradiating means 121a is reflected by the optically reflective portion 81a, and is then rendered incident on the light-receiving means 121b; and, the other case where the optical signal from the light-irradiating means 121a is irradiated to the optically non-reflective portion 81b, and is not reflected thereby, with the result that no optical signal is rendered incident on the light-receiving means 121b. Then, PR 121 detects such a pattern of the pulse signal.

Turning now to the light-sealing member 11b or an inhibiting means, this member 11bis arranged to be interposed between PR 121 and the circular plate 81 when being moved in union with free rotation of the cam 11. As a result, light is blocked from entering between PR 121 and the revolving circular plate 81. To be specific, in this state, the optical signal irradiated from the light-irradiating means 121a is always reflected by the optically reflective surface 11c of the light-sealing member 11b. Consequently, the light-receiving means 121b always receives the optical signal. Meanwhile, when such a light tight state caused by the light-sealing member 11b is released, the pulse-generating means consisting of PR 121 and the revolving circular plate 81, as described above, produces a pattern of the pulse signal.

The movement detection and control device constructed as above according to the third embodiment behaves in a manner similar to the first embodiment, and is also possible to provide beneficial effects quite similar to those in the first and second embodiments.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. A movement detection and control device comprising:
   a lens frame having a lens, said lens frame being supported in a manner movable in a direction of an optical axis of said lens;
   a moving means for moving said lens frame in a direction along said optical axis;
   a driving source for driving said moving means;
   a pulse-generating means for generating a pulse signal in response to driving caused by said driving source; and
   a control means for counting a pulse signal generated by said pulse-generating means, and further for driving said driving source in such a controlled manner that said lens frame is moved by a predetermined amount; wherein said moving means is provided with an inhibiting means movable past the pulse generating means for hindering said pulse-generating means from generating said pulse signal in one of an area where said moving means starts movement and an area where said moving means finishes movement even though said pulse-generating means is in an operating state and is otherwise capable of generating a pulse.

2. A movement detection and control device as defined in claim 1, wherein said moving means includes a moving member to be driven into linear movement.

3. A movement detection and control device as defined in claim 1, wherein said moving means includes a moving member to be rotatably driven.

4. A movement detection and control device as defined in claim 1, wherein said driving source is a rotational driving source for rotating said moving means in only one direction.

5. A movement detection and control device as defined in claim 1, wherein said driving source is a rotational driving source for selectively rotating said moving means in either of two opposing directions.

6. A movement detection and control device in a camera driven by a driving source in a controlled manner, comprising:
   a pattern-rotating member rotated in union with said driving source, said pattern-rotating member having a plurality of patterns for use in generation of a pulse signal formed at predetermined intervals;
   a pulse signal-detecting means having a light-emitting portion and a light-receiving portion, and having an optical path formed and positioned so as to extend from said light-emitting portion to said light-receiving portion through said pattern-rotating member, said pulse signal-detecting means generating a pulse signal in response to movement of said patterns when said pattern-rotating member is in a process of rotation; and a moving member disposed for movement in union with said driving source, said moving member being moved between first and second states, in which first state, said optical path between said light-emitting portion and said light-receiving portion is shielded to prevent said pattern-rotating member and said pulse signal-detecting means from generating a pulse signal, while such a state of said optical path being shielded is released in said second state, thereby allowing said pattern-rotating member and said pulse signal-detecting means to generate a pulse signal;

a cam member integrally disposed on said moving member;

a photographic lens in abutment with said cam member and driven in response to movement of said moving member, in which said photographic lens assumes an initial position when said moving member is in said first state, while said photographic lens assumes a position in the process of movement when said moving member is in said second state; and a control means for initiating a count of a pulse signal generated by said pulse signal-detecting means when detecting a pattern after said moving member is shifted to said second state from said first state, and further for controlling a driven amount of said photographic lens in accordance with a pulse signal count.

* * * * *

UNITED STATES PATENT AND TRADEMARK OFFICE
CERTIFICATE OF CORRECTION

PATENT NO. : 5,887,203
DATED : March 23, 1999
INVENTOR(S) : Hiroaki Miyazaki

It is certified that error appears in the above-identified patent and that said Letters Patent is hereby corrected as shown below:

Title page,
Item [56], IN REFERENCES CITED
After "U.S. Patent Documents" insert:

-- (1) 5,600,397   02/1997   Shiokama            396/133
   (2) 5,499,071   03/1996   Wakabayashi et al.  354/173.1
   (3) 5,481,331   01/1996   Cocca et al.        354/412
   (4) 5,325,145   06/1994   Hirasawa            354/400
   (5) 5,345,290   09/1994   Watanabe et al.     354/400 --

IN THE ABSTRACT
Line 7, delete the word "detector" and insert therefor -- detecting --.
Line 12, delete the work " detector" and insert therefor -- pulse generating member --.

Column 6,
Line 2, delete the word "lightreceiving" and insert therefor -- light-receiving --.

Column 9,
Line 9, delete the word "XI" and insert therefor -- X --.
Line 52, delete the word "BA" and insert therefor -- 6A --.

Column 11,
Line 18, delete the word "patternrevolving" and insert therefor -- pattern-revolving --.
Line 59, delete the word "11bis" and insert therefor -- 11b is --.

Signed and Sealed this

Eleventh Day of September, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,887,203
DATED : March 23, 1999
INVENTOR(S) : Hiroaki Miyazaki

Page 1 of 1

It is certified that error appears in the above-identified patent and that said Letters Patent is hereby corrected as shown below:

ABSTRACT,
Line 7, before the word "detects" insert therefor -- section --.

Signed and Sealed this

Eighteenth Day of December, 2001

Attest:

Attesting Officer

JAMES E. ROGAN
Director of the United States Patent and Trademark Office